(12) United States Patent
Edwards et al.

(10) Patent No.: US 9,366,548 B2
(45) Date of Patent: Jun. 14, 2016

(54) VARIABLE RELUCTANCE SENSOR INTERFACES AND METHODS OF THEIR OPERATION

(71) Applicant: Freescale Semiconductor, Inc., Austin, TX (US)

(72) Inventors: William E. Edwards, Ann Arbor, MI (US); Mike R. Garrard, Jaywick (GB)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 268 days.

(21) Appl. No.: 14/045,473

(22) Filed: Oct. 3, 2013

(65) Prior Publication Data
US 2015/0097556 A1    Apr. 9, 2015

(51) Int. Cl.
| | | |
|---|---|---|
| G01B 7/30 | (2006.01) | |
| G01D 5/20 | (2006.01) | |
| G01P 3/488 | (2006.01) | |
| G01P 3/489 | (2006.01) | |
| G08C 13/00 | (2006.01) | |
| G01P 1/00 | (2006.01) | |
| G01L 7/00 | (2006.01) | |

(52) U.S. Cl.
CPC  G01D 5/20 (2013.01); G01P 3/488 (2013.01); G01P 3/489 (2013.01); G01L 7/00 (2013.01); G01P 1/00 (2013.01); G08C 13/00 (2013.01)

(58) Field of Classification Search
CPC ...... G01P 1/00; G08C 13/00; G08C 2200/00; G08C 1/00; G01D 1/00; G01R 1/00; G01B 1/00; G01B 2210/00; G01C 1/00; G01J 1/00; G01L 1/00; G01L 7/00
See application file for complete search history.

(56) References Cited

U.S. PATENT DOCUMENTS

| | | | | |
|---|---|---|---|---|
| 5,682,095 A | * | 10/1997 | Mathes | ................... G01D 5/147 324/174 |
| 5,747,987 A | * | 5/1998 | Smith | .................... G01B 3/002 123/617 |
| 5,977,765 A | | 11/1999 | Gibson et al. | |
| 6,181,127 B1 | * | 1/2001 | Wallrafen | ................ G01B 7/14 324/163 |
| 6,291,990 B1 | * | 9/2001 | Nakane et al. | ........... 324/207.25 |
| 6,674,279 B2 | | 1/2004 | Manlove et al. | |
| 2005/0225321 A1 | * | 10/2005 | Kurumado | ............... 324/207.21 |
| 2006/0097717 A1 | * | 5/2006 | Tokuhara et al. | ........ 324/207.25 |
| 2013/0328554 A1 | | 12/2013 | Pigott et al. | |
| 2014/0035561 A1 | | 2/2014 | Pigott et al. | |
| 2014/0266176 A1 | * | 9/2014 | Fernandez et al. | ............ 324/244 |

* cited by examiner

*Primary Examiner* — Huy Q Phan
*Assistant Examiner* — Temilade Rhodes-Vivour (57) ABSTRACT

The embodiments described herein include systems with a variable reluctance sensor (VRS) interface and methods of their operation that may reduce the probability of erroneous transitions in a resulting generated detect signal. As such, the VRS interface can improve the accuracy of position and/or motion determinations, and thus can improve the performance of a wide variety of devices that use variable reluctance sensors. In one embodiment the VRS interface uses a comparator with hysteresis to generate a trailing edge signal. In another embodiment the VRS interface uses bias voltages to reduce the probability of erroneous transitions in a trailing edge signal. In either case the VRS interface can prevent erroneous transitions in the detect signal and thus may improve the performance and accuracy of the system.

16 Claims, 8 Drawing Sheets

VARIABLE RELUCTANCE SENSOR INTERFACES AND METHODS OF THEIR OPERATION

TECHNICAL FIELD

Embodiments of the subject matter described herein relate generally to variable reluctance sensors.

BACKGROUND

Variable reluctance sensors (VRSs) are commonly used to measure the angular position and/or speed of a moving or rotating ferromagnetic object. For example, they can be used to measure the angular position and/or speed of a rotating wheel having one or more teeth. One such application is the crankshaft of an automobile. For example, a toothed ferrous (iron based) wheel is mounted to the crankshaft and the VRS is used to sense each passing tooth during rotation of the crankshaft.

In such an application crankshaft position can be used to set engine timing for engine control including ignition and fuel injection timing and the like. The VRS typically includes a coil and biasing magnet positioned near the toothed wheel, in which each tooth passing by the VRS changes the magnetic flux which is converted to an electrical voltage induced in the coil. A VRS interface senses and conditions the electrical signal to derive timing parameters. In this manner, the rotating motion of the crankshaft is converted to an electronic signal which is used to determine the position and speed of the crankshaft.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

Variable reluctance sensors (VRSs) are commonly used to measure the angular position and/or speed of rotating objects. For example, they can be used to measure the angular position and/or speed of a rotating shaft such as a crank or cam shaft in an internal combustion engine where a wheel having one or more teeth is mounted on the shaft. Typical VRSs include a coil and biasing magnet positioned near the toothed wheel, and each tooth passing by the VRS causes a change in the magnetic flux which is converted to an electrical voltage induced in the coil. This induced voltage generates a VRS signal. A VRS interface senses and conditions the VRS signal to derive timing parameters of the wheel. In this manner, the rotating motion of the wheel is converted to an electronic signal which is used to determine the position and/or speed of the wheel.

In one example the VRS signal is processed to generate a detect signal pulse corresponding to the tooth width in degrees. Specifically, the increase in VRS signal caused by the leading edge of the tooth passing by the VRS biasing magnet is detected by the VRS and used to generate the leading edge of the detect signal pulse. Likewise, the decrease in VRS signal caused by the trailing edge of the tooth passing by the VRS magnet is detected and used to generate the trailing edge of the detect signal pulse. In a typical implementation the detections of these edges are performed by comparators that receive the VRS signal, with a first comparator used to detect the leading edge of the tooth and a second comparator used to detect the trailing edge of the tooth. The two detections together generate the detect signal pulse with a width that corresponds to the timing difference between the leading and trailing edges of the tooth. Thus generated the rising and falling edges of the detect signal pulse can be used to determine the angular position(s) and/or speed of the tooth and the wheel.

In many cases the accurate generation of the detect signal pulse can be negatively impacted by the effects of various physical properties of the electro-mechanical systems, such as synchronous and asynchronous noise, the dynamic range of the input signal, and signal variations caused by aging and mechanical tolerances, such as tooth variations, relative placement between the sensor and tooth placement, etc. For example, turning to FIG. 8, graphical representations of an exemplary VRS signal 802 and a resulting detect signal 804 generated by a VRS interface are illustrated. In this example the detect signal 804 has erroneous transitions at times T3 and T4 that do not correspond to actual edges of the tooth. Thus, such transitions in detect signal 804 can result in erroneous determinations of position and/or speed of the wheel.

Figure 8:
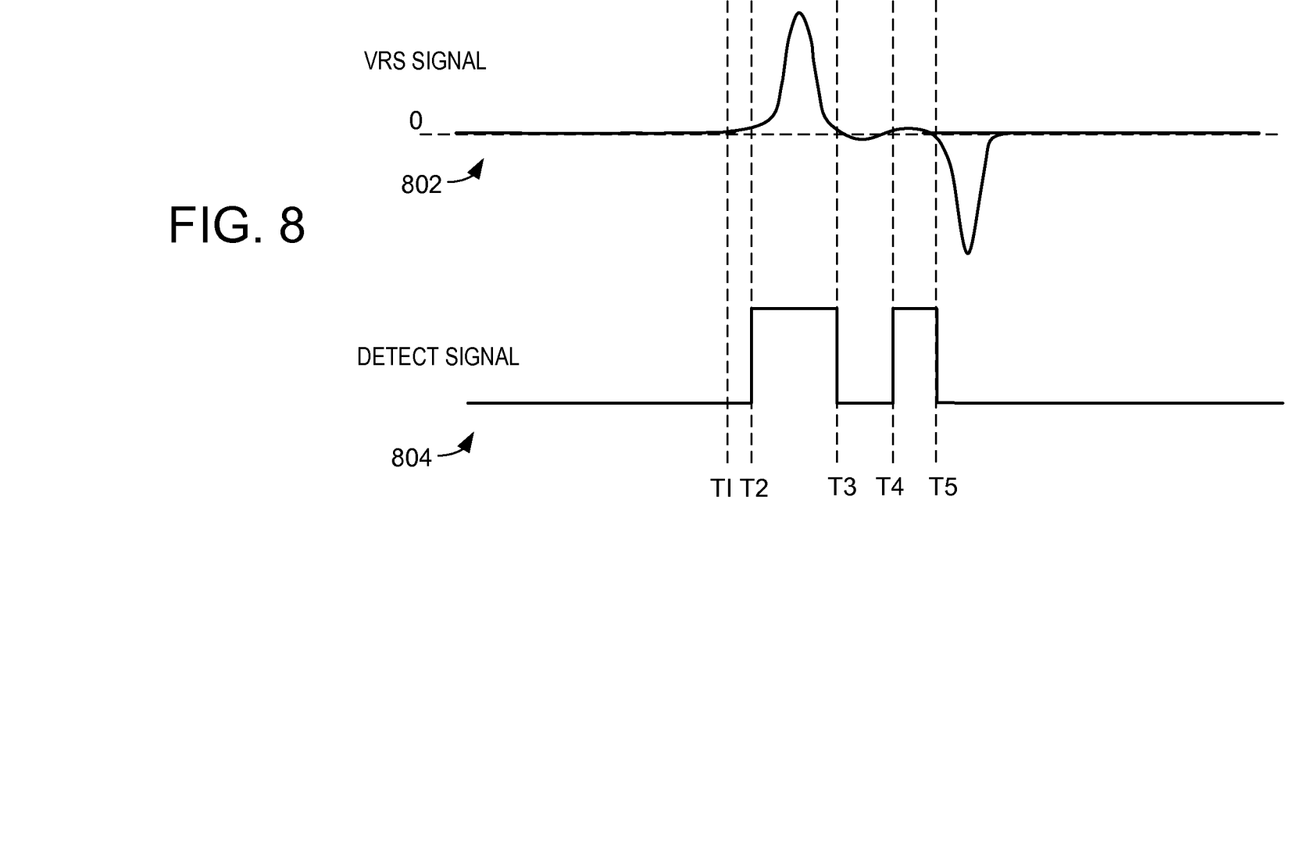
FIG. 8 is a graphical representation of a variable reluctance sensor signal and detect signal pulse.

In the example of FIG. 8 at time T1 the VRS signal 802 begins to increase in response to the leading edge of the tooth rotating toward the sensor and the resulting change in magnetic flux detected by the VRS. At time T2 the VRS interface generates the leading edge of a detect signal 804 pulse in response to the resulting VRS signal 802 rising above a threshold value. The VRS signal 802 peaks, then, as the leading edge of the tooth passes the sensor the VRS signal 802 drops as the change in flux ceases. In some cases this drop of the VRS signal 802 can result in noise, e.g., erroneous transitions generated in the detect signal. Specifically, this can occur when the drop of the VRS signal 802 drops below the threshold values of the comparator used to generate the detect signal.

In this illustrated example this drop in VRS signal 802 occurs and incorrectly results in an erroneous trailing edge of the detect signal pulse being generated at time T3. This transition is early, occurring before the trailing edge of the tooth actually arrives. Then, the subsequent increase in VRS signal 802 at time T4 generates an erroneous leading edge of the detect signal 804 pulse. When the actual trailing edge of the tooth arrives the VRS signal 802 is driven down by the resulting change in reluctance, then at time T5, the VRS interface generates a second trailing edge of the detect signal 804 pulse.

Again, because the erroneous transitions at times T3 and T4 do not correspond to actual edges of a tooth they can result in erroneous determinations of angular position and/or speed of the wheel.

In the embodiments described herein a VRS interface is provided that may reduce the probability of erroneous transitions in the resulting detect signal. As such, the VRS interface can improve the accuracy of position and/or motion determinations, and thus can improve the performance of a wide variety of devices that use VRSs. In a first embodiment, a VRS interface is configured to include a trailing edge comparator with hysteresis. The trailing edge comparator is configured to generate a trailing edge signal at the output when the VRS signal 802 drops below a threshold value. Implementing this trailing edge comparator with hysteresis may reduce the probability of erroneous transitions by reducing the probability that a VRS signal will drop below the threshold voltage in between the leading and trailing edges of a tooth. This may thus prevent a trailing edge signal from being erroneously generated, and may likewise prevent erroneous transitions in the detect signal pulse.

In a second embodiment, a VRS interface is configured to include a first biasing element and a second biasing element. The first biasing element is configured to apply a first bias voltage to a leading edge comparator and a trailing edge comparator. The second biasing element is configured to apply a second bias voltage to the trailing edge comparator. Specifically, the second bias voltage is provided to a second input of the trailing edge comparator to determine a threshold value of the trailing edge comparator. The first bias voltage and the VRS signal are provided to a first input of the leading edge comparator and a first input of the trailing edge comparator. So configured, the first bias voltage effectively offsets the VRS signal away from the threshold of the trailing edge comparator as determined by the second bias voltage. Taken together the first and second bias voltages may reduce the probability of erroneous transitions by reducing the probability that the VRS signal will drop below the threshold voltage in between the leading and trailing edges of a tooth. This may thus prevent a trailing edge signal from being erroneously generated, and may likewise prevent erroneous transitions in the detect signal pulse.

Figure 1:
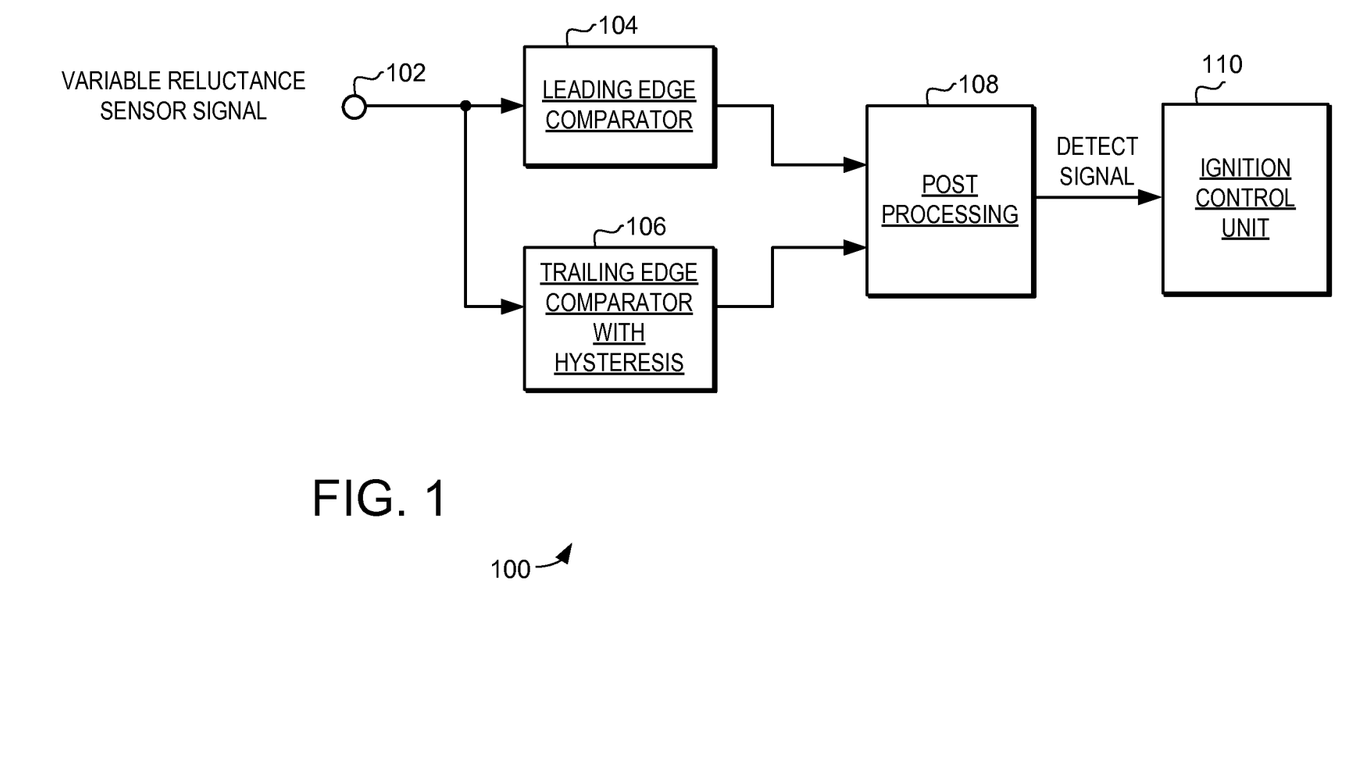
FIG. 1 is a schematic diagram of a variable reluctance sensor interface in accordance with an example embodiment.

Turning now to FIG. 1, a simplified schematic diagram of a VRS interface 100 is illustrated. The VRS interface 100 includes an input 102, a leading edge comparator 104, a trailing edge comparator 106, and a post-processing circuit 108. The VRS interface 100 is configured to receive a VRS signal from a VRS at the input 102. A detect signal is generated by the VRS interface 100 and provided to an ignition control unit 110. As was described above VRSs are commonly used to measure the angular position and/or speed of rotating objects such as wheels having one or more teeth. In these VRSs the leading and trailing edges of a tooth passing by the VRS cause changes in the magnetic flux, which generate a VRS signal.

In this illustrated embodiment the trailing edge comparator 106 is implemented with hysteresis. Specifically, the threshold values used to determine switching of the trailing edge comparator 106 are different depending on the current state of the trailing edge comparator 106. As one specific example, the threshold value of the trailing edge comparator 106 is lower when the trailing edge signal is not asserted compared to when the trailing edge signal is asserted. As will be described in greater detail below, this reduced threshold when not asserted may reduce the probability that a VRS signal will drop below the reduced threshold voltage in between the leading and trailing edges of a tooth. And as will also be further explained, this may reduce the probability of erroneous transitions in a generated detect signal.

The leading edge comparator 104 is coupled to the input 102 and is configured to receive the VRS signal. The leading edge comparator 104 includes an output and is configured to provide a leading edge signal at the output responsive to the VRS signal reaching a first threshold value. Likewise the trailing edge comparator 106 is coupled to the input 102 and is configured to also receive the VRS signal. The trailing edge comparator 106 includes an output and is configured to provide a trailing edge signal at the output responsive to the VRS signal reaching a second threshold value. The trailing edge comparator 106 is further configured to continue to provide the trailing edge signal until the VRS signal reaches a third threshold value. In order for the trailing edge comparator 106 to be implemented with hysteresis this third threshold value is different from the second threshold value used to assert the trailing edge signal.

The post-processing circuit 108 is configured to receive both the leading edge signal and the trailing edge signal and generate a detect signal pulse responsive to those signals. Specifically, the post-processing circuit 108 generates a detect signal pulse with a leading edge determined from the leading edge signal, and a trailing edge determined from the trailing edge signal. Thus generated, the detect signal pulse has a width corresponding to the timing difference between assertion the leading edge signal and assertion of the trailing edge signal. This detect signal pulse can be used to determine the position and/or speed of the tooth and the wheel. Specifically, the ignition control unit 110 receives the detect signal pulse and is configured to control ignition timing based at least in part on the detect signal pulse. For example, the ignition control unit 110 can be configured to determine an angular position of a rotating shaft and control the timing of a capacitive discharge ignition based on that determination.

Furthermore, because the trailing edge comparator 106 is implemented with hysteresis, erroneous transitions in the detect signal pulse may be prevented and the performance and accuracy of the system may improve. Specifically, the second and third threshold values used by the trailing edge comparator 106 are selected to reduce erroneous transitions. As one specific example, the trailing edge comparator 106 uses a relatively low threshold value when the trailing edge signal is not asserted compared to a relatively high threshold value that is used when the trailing edge signal is asserted. This relatively low threshold that is used when the trailing edge signal is not asserted may reduce the probability of erroneous transitions in the detect signal pulse by reducing the probability that a VRS signal will drop below the relatively low threshold voltage in between the leading and trailing edges of a tooth. This may prevent a trailing edge signal from being erroneously asserted, and may likewise prevent erroneous transitions in the detect signal pulse generated by post-processing circuit 108. Such a reduction in false detections of the trailing tooth edge after the leading tooth edge can provide improved noise immunity.

The VRS interface 100 can be used in a variety of different applications. For example, the toothed wheel can comprise a trigger wheel coupled to a rotating shaft, with the detect signal pulse then used to determine an angular position of a rotating shaft. In such examples the detect signal pulse can be used to generate ignition events for internal combustion engines. In these embodiments the VRS is used to sense the rotation of a crankshaft. From this, the crankshaft position and top dead center can be used to set engine timing, including ignition and fuel injection timing and the like. For example, the VRS can be used in a capacitive discharge ignition (CDI) system. In CDI systems capacitor discharge current is used to fire the spark plugs in the internal combustion engine. CDI systems do not typically suffer from the long charging times associated with the inductance coils used in inductive discharge systems. As such, CDI systems are particularly applicable to high speed engines, but CDI systems are also used in a wide variety of other engines. CDI systems commonly employ one or more relatively large teeth spanning a relatively large angular range around the circumference of the wheel. For example, CDI systems can use one or more teeth that span a range between about 20 degrees to about 70 degrees, with teeth between about 30 and 60 degrees being commonly used. However, the magnetic properties of such a wide tooth are large with respect to the VRS, making the system susceptible to noise when the sensor is positioned between the leading and trailing tooth edges. Such noise can lead to erroneous transitions in the detect signal between edges as was illustrated in FIG. 8. The embodiments described herein thus can be used to reduce the probability that such noise will generate erroneous transitions in the detect signal. And thus, the embodiments described herein are particularly applicable for use in controlling ignition timing in a CDI or other type of system that uses relatively wide teeth.

Figure 2:
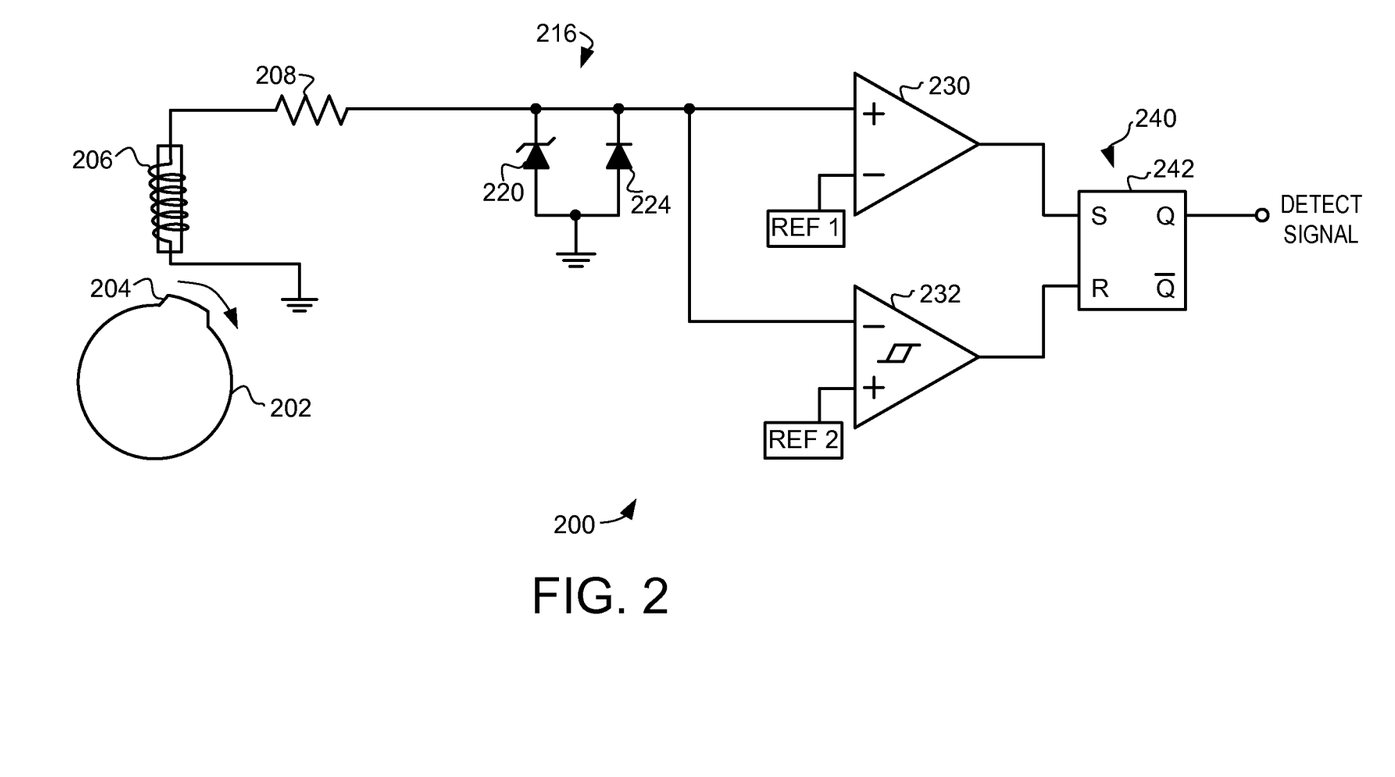
FIG. 2 is a schematic diagram of a variable reluctance sensor interface in accordance with another example embodiment.

Turning now to FIG. 2, a schematic diagram of another embodiment of a VRS interface 200 is illustrated. The VRS interface 200 includes a resistor 208, a clamping circuit 216, a leading edge comparator 230, a trailing edge comparator 232, and a post-processing circuit 240. As will be described below, in some embodiments the trailing edge comparator 232 is implemented with hysteresis such that a second threshold value used to detect the trailing edge of the tooth 204 is different than a third threshold value used to reset the trailing edge comparator 232.

In this illustrated example the VRS interface 200 is coupled to a VRS 206. The VRS 206 generates a VRS signal which is processed by VRS interface 200. Specifically, the VRS 206 is configured to sense the rotation of a tooth 204 on a trigger wheel 202. In the illustrated configuration, the VRS 206 includes a coil and a biasing magnet which is orthogonally positioned relative to the trigger wheel 202. The trigger wheel 202 is mounted to a crankshaft (not shown) or other rotating member. The trigger wheel 202 is configured as a toothed wheel, and the VRS 206 senses each passing of the tooth 204. Specifically, as the trigger wheel 202 rotates, each passing of the tooth 204 causes a change in the magnetic flux of the biasing magnet through the coil. The coil converts this changing magnetic flux to an electrical VRS signal. The VRS signal is applied to the VRS interface 200 at the input node of resistor 208. The actual form of the VRS signal generated by the VRS 206 depends on various system parameters, such as the shape and configuration of the teeth, the position and/or orientation of the VRS 206, etc.

The resistor 208 and the clamping circuit 216 serve to limit the current and voltage swings in the interface 200 to acceptable levels. Specifically, clamping circuit 216 is implemented with the diodes 220 and 224. The diodes 220 and 224 serve to limit voltage swings in the VRS interface 200 to acceptable levels. Likewise, the resistor 208 serves to limit current through the VRS interface.

The VRS signal is provided to the non-inverting (+) input of the leading edge comparator 230 and to the inverting (−) input of the trailing edge comparator 232. A first reference signal is provided to the inverting input of the leading edge comparator 230, as indicated by REF 1. Likewise, a second reference signal is provided to the non-inverting input of the trailing edge comparator 232, as indicated by REF 2.

In some embodiments REF 1 and/or REF 2 provide the same or equivalent reference signals. For example, in some embodiments both inputs are grounded. In other embodiments different reference signals are provided by REF 1 and REF 2 to the inputs. For example, different voltage values can be provided to individually control the reference values and thus the switching points of the comparators 230 and 232.

During operation the leading edge comparator 230 outputs a leading edge signal to one input of the post-processing circuit 240. This leading edge signal is asserted when a leading edge of a tooth 204 causes an increase in the VRS signal above the first threshold value determined by REF 1. Likewise, the trailing edge comparator 232 outputs a trailing edge signal to the other input of the post-processing circuit 240. This trailing edge signal is asserted when a trailing edge of a tooth 204 causes a decrease in the VRS signal below the second threshold value provided by REF 2. Both the leading edge signal and the trailing edge signal are provided to the post-processing circuit 240.

In this illustrated embodiment the post-processing circuit 240 is implemented with a set-reset (SR) latch 242. The leading edge signal is provided to the first input (i.e., the set input) of the latch 242, and the trailing edge signal is provided to the second input (i.e., the reset input) of the latch 242. The latch 242 output asserts in response to an asserted first input, and the latch 242 output de-asserts (or resets) in response to an asserted reset input. Thus, the latch 242 operates to generate detect signal pulses with the timing of the leading edge of the pulse determined by the assertion of the leading edge signal and the timing of the trailing edge of the pulse determined by the assertion of the trailing edge signal. It should be noted that the SR latch 242 is just one example of the type of circuit that can be used for post-processing circuit 240. For example, other latches and other logic circuits can be used.

In accordance with the embodiments described herein the trailing edge comparator 232 can be implemented with hysteresis. In such an embodiment a second threshold value used to detect the trailing edge of the tooth 204 is different than a third threshold value used to reset the trailing edge comparator 232. Thus, the trailing edge signal is asserted when the trailing edge of the tooth 204 causes a decrease in the VRS signal below the second threshold, and this trailing edge signal will remain asserted until the passing of the trailing edge of the tooth 204 allows the VRS signal to rise above a third threshold value, where the third threshold value is different than the second threshold value. As one specific example, the second threshold value of the trailing edge comparator 232 (the threshold value corresponding to a transition of the trailing edge signal to the asserted state) is less than the third threshold value (the threshold value corresponding to a transition of the trailing edge signal to a non-asserted state).

This relatively low second threshold value that is used prior to the trailing comparator 232 being asserted may reduce the probability of erroneous transitions in the detect signal pulse by reducing the probability that a VRS signal will drop below the relatively low second threshold voltage in between the leading and trailing edges of a tooth 204. This may prevent a trailing edge signal from being erroneously generated and may likewise prevent erroneous transitions in the detect signal pulse generated by post-processing circuit 240.

The implementation of the trailing edge comparator 232 with hysteresis can be made in a variety of ways. For example, such an implementation can be made using externally provided hysteresis and/or internally provided hysteresis. In general, internal hysteresis could be implemented by the internal configuration of the trailing edge comparator 232. Conversely, external hysteresis could be implemented by varying the value of the second reference signal provided by REF 2, with the value of the second reference signal being based on the current output state of the comparator 232.

For example, an implementation of external hysteresis can be provided using feedback from the output of the trailing edge comparator 232. In one specific embodiment the trailing edge comparator 232 is implemented with positive feedback to generate external hysteresis operation. In such an embodiment the value of the second reference signal provided by REF 2 is determined using such positive feedback. In other cases additional transistors or a push pull output can be implemented to shift the value of REF 2. In any such cases REF 2 would change to the second, relatively low threshold value in one state and change to the third, relatively high threshold value in the second state. Again, these are just some examples of how external hysteresis could be implemented. Furthermore, in other implementations the trailing edge comparator 232 can use internally provided hysteresis. In yet other embodiments a combination of external and internal hysteresis may be used.

And again, because the trailing edge comparator 232 is implemented with hysteresis, erroneous transitions that could otherwise occur in the detect signal pulse may be avoided. Instead, only transitions corresponding to actual tooth edges are generated, resulting in a clean and accurate detect signal pulse that may be used to determine the position and/or speed of the rotating wheel 202.

Figure 3:
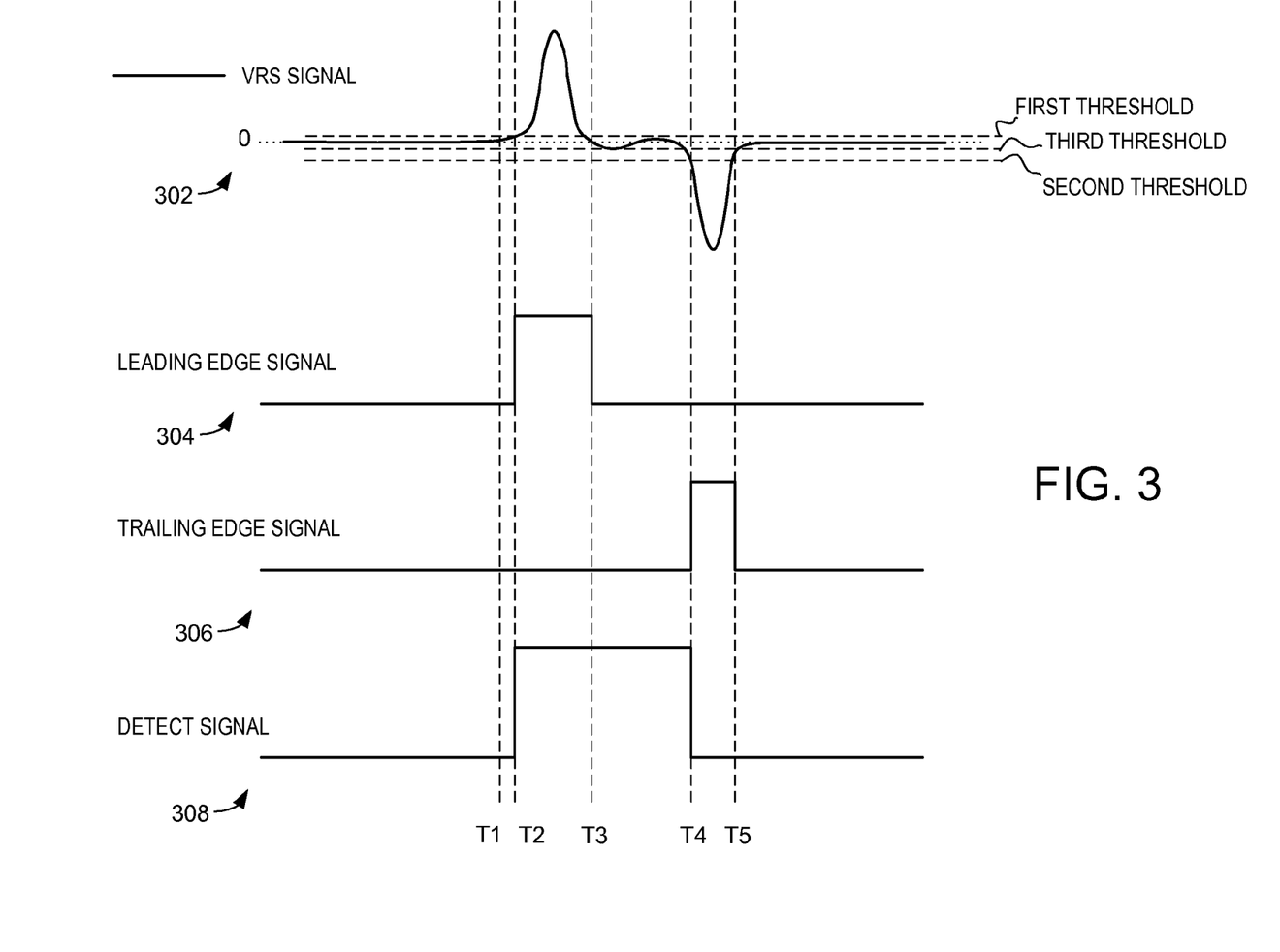
FIG. 3 is a graphical representation of a variable reluctance sensor signal, leading edge signal, trailing edge signal, and detect signal pulse in accordance with an example embodiment.

Turning now to FIG. 3, a graphical representation of an exemplary VRS signal 302, a leading edge signal 304, a trailing edge signal 306, and a resulting detect signal 308 generated by the VRS interface 200 are illustrated. In this example the VRS signal 302 does not drop below the second threshold value between leading and trailing edges, and thus erroneous transitions in the detect signal 308 that do not correspond to actual tooth edges are not generated.

In general, during operation the VRS signal 302 increases in response to the leading tooth edge and decreases when the tooth 204 is aligned with the VRS 206, and then decreases further as the trailing tooth edge passes and the tooth 204 begins to retreat from the VRS 206 reaching a negative peak. The next passing of the tooth 204 generates similar positive and negative peaks in the VRS signal 302 after any dead-time period between passings of the tooth 204 or other such consecutive teeth. It should be noted that in this example the VRS signal 302 has a substantially constant voltage when a tooth is not proximate to a sensor. Furthermore, the second threshold value for the trailing edge comparator 232 is different than (lower than) this substantially constant voltage.

Referring now to FIGS. 2 and 3 together, at time T1 the VRS signal 302 begins to increase in response to the leading edge of the tooth 204 rotating to the VRS 206 and the resulting change in magnetic flux. At time T2 the VRS signal 302 rises above the first threshold defined by REF 1 and the leading edge comparator 230 asserts the leading signal 304. The assertion of the leading edge signal 304 causes the post-processing circuit 240 to generate the leading edge of a detect signal 308 pulse. Then, in response to the leading edge of the tooth 204 passing the VRS 206 the VRS signal 302 drops as the change in flux ceases. As was described above with reference to FIG. 8, in some cases this drop of the VRS signal 302 can result in noise, e.g., erroneous transitions generated in the detect signal 308.

In this illustrated example however, the use of a trailing edge comparator 232 with hysteresis prevents these erroneous transitions because the VRS signal 302 does not drop below the second threshold value between times T2 and T4. However, when the trailing edge of the tooth 204 passes the VRS 206 the VRS signal 302 is driven low enough for the VRS signal 302 to drop below the second threshold value. This occurs at time T4, and causes trailing edge signal 306 to be asserted and the corresponding trailing edge of the detect signal 308 pulse to be correctly generated at time T4.

Thus generated, the detect signal 308 pulse has a width corresponding to the timing difference between the actual leading edge and trailing edge of the tooth 204 passing by the VRS 206. Both edges of this detect signal pulse can thus be used to accurately determine the angular position and/or rotational speed of the tooth 204 and the wheel 202. Stated another way, by providing a trailing edge comparator 232 with hysteresis the VRS signal 302 is prevented from dropping below the second threshold value and false detections of the trailing tooth edge are reduced.

Next, the trailing edge of the tooth 204 passes the VRS 206 and in response the VRS signal 302 increases as the change in flux again ceases. At time T5 the VRS signal 302 reaches the third threshold value, causing the trailing edge comparator 232 to de-assert the trailing edge signal 306. This resets the trailing edge comparator 232 before the leading edge of the next tooth 204 is detected. In order for the trailing edge comparator 232 to be implemented with hysteresis the third threshold value is greater than the second threshold value. In addition, the third threshold value may be less than or equal to the first threshold value. This can provide improved noise immunity when the VRS 206 is between the leading and trailing edges of the tooth 204. Specifically, the difference in the second and third threshold values that provides the hysteresis can facilitate improved noise immunity.

Figure 4:
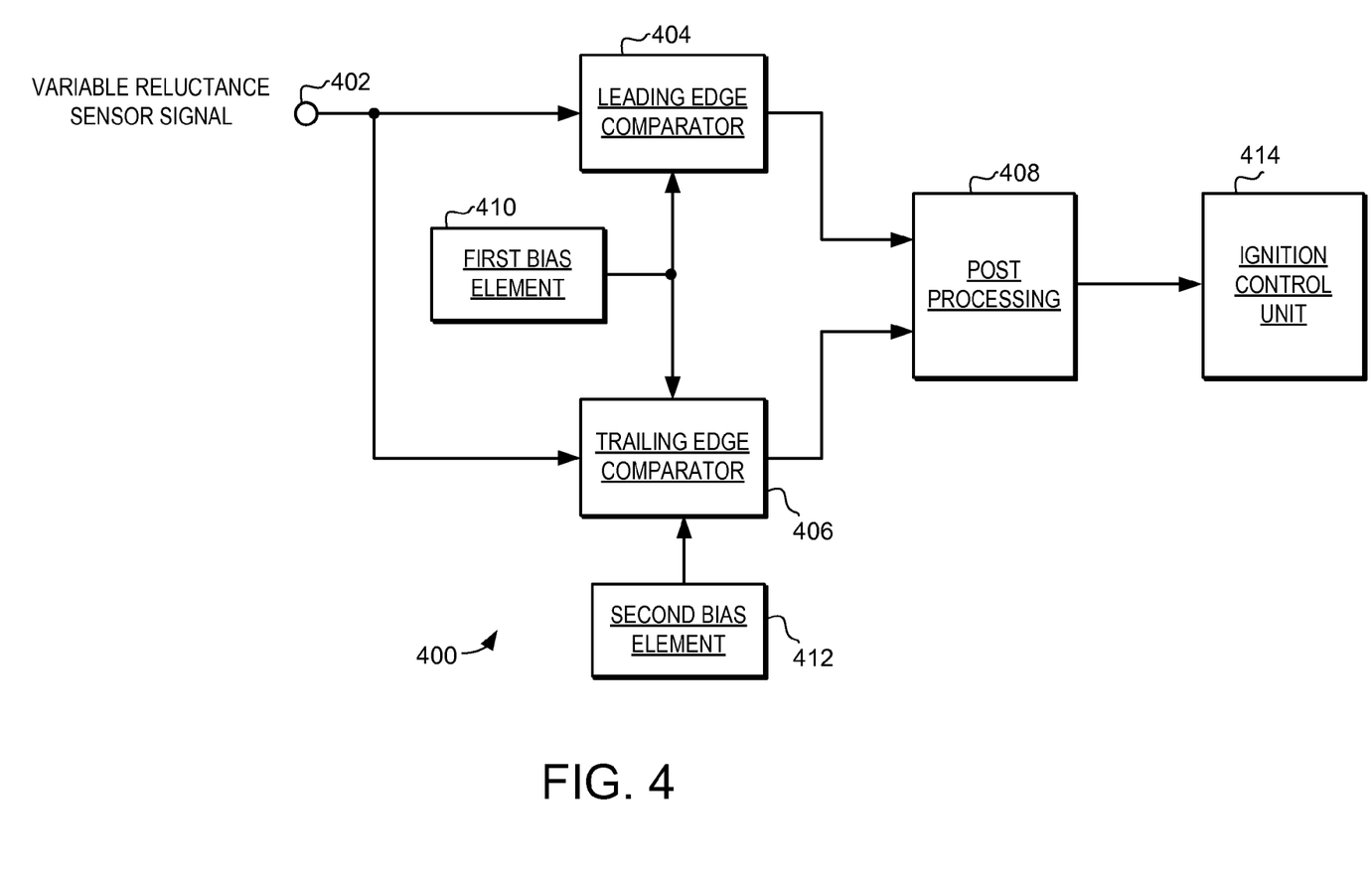
FIG. 4 is a schematic diagram of a variable reluctance sensor interface in accordance with another example embodiment.

Turning now to FIG. 4, a simplified schematic diagram of a VRS interface 400 is illustrated. The VRS interface 400 includes an input 402, a leading edge comparator 404, a trailing edge comparator 406, and a post-processing circuit 408. Also included are a first bias element 410 and a second bias element 412. The VRS interface 400 is configured to receive a VRS signal from a VRS at the input 402. A detect signal is generated by the VRS interface 400 and provided to an ignition control unit 414. As was described above VRSs are commonly used to measure the angular position and/or speed of rotating objects such as wheels having one or more teeth. In these VRSs the leading and trailing edges of a tooth passing by the VRS cause changes in the magnetic flux, which generate a VRS signal.

In this illustrated embodiment the first bias element 410 is coupled to the leading edge comparator 404 and the trailing edge comparator 406. Likewise, the second bias element 412 is coupled to the trailing edge comparator 406. The first bias element 410 is configured to apply a first bias voltage to the leading edge comparator 404 and the trailing edge comparator 406. The second bias element 412 is configured to apply a second bias voltage to the trailing edge comparator. In general, the first bias element 410 provides a first bias voltage (or "baseline voltage") for both comparators 404, 406, while the second bias element 412 provides a second bias voltage (or "offset voltage") that is offset from the baseline voltage provided by the first bias element 410. Taken together, this use of the first and second bias voltages may reduce the probability of erroneous transitions by reducing the probability that the VRS signal will drop below a threshold voltage associated with the second bias voltage in between the leading and trailing edges of a tooth. Furthermore, this may thus prevent a trailing edge signal from being erroneously asserted, and may likewise prevent erroneous transitions in the detect signal pulse.

The leading edge comparator 404 is coupled to the input 402 and is configured to receive the VRS signal. The leading edge comparator 404 includes an output and is configured to provide a leading edge signal at the output responsive to the VRS signal reaching a first threshold value. Likewise the trailing edge comparator 406 is coupled to the input 402 and is configured to also receive the VRS signal. The trailing edge comparator 406 includes an output and is configured to provide a trailing edge signal at the output responsive to the VRS signal reaching a second threshold value.

The post-processing circuit 408 is configured to receive both the leading edge signal and the trailing edge signal and generate a detect signal pulse responsive to those signals. Specifically, the post-processing circuit 408 generates a detect signal pulse with a leading edge determined from the leading edge signal, and a trailing edge determined from the trailing edge signal. Thus generated, the detect signal pulse has a width corresponding to the timing difference between assertion of the leading edge signal and assertion of the trailing edge signal. This detect signal pulse can be used to determine the position and/or speed of the tooth and the wheel. Specifically, the ignition control unit 414 receives the detect signal pulse and is configured to control ignition timing—for example, the timing of a capacitive discharge ignition based at least in part on the detect signal pulse.

Again, the first bias voltage provided by first bias element 410 effectively provides a DC shift to the VRS signal away from zero, thus providing a baseline amount for the input to both comparators 404, 406. The second bias voltage provided by second bias element 412 determines a threshold voltage from the baseline voltage. In the illustrated example, the first bias element 410 has shifted the VRS a positive direction above ground, while the second bias element 412 provides a negative, below ground, threshold value. Thus, in the configuration of the first bias element 410 and the second bias element 412 together function to shift in opposite directions. Taken together, this use of the first and second bias voltages may reduce the probability of erroneous transitions by reducing the probability that the VRS signal will drop below the threshold voltage of the trailing edge comparator 406 between the leading and trailing edges of a tooth. Furthermore, this may thus prevent a trailing edge signal from being erroneously asserted, and may likewise prevent erroneous transitions in the detect signal pulse. Such a reduction in false detections of the trailing tooth edge after the leading tooth edge can provide improved noise immunity. As with the VRSs 100, 200, embodiments previously discussed, the VRS interface 400 can be used in a variety of different applications.

Figure 5:
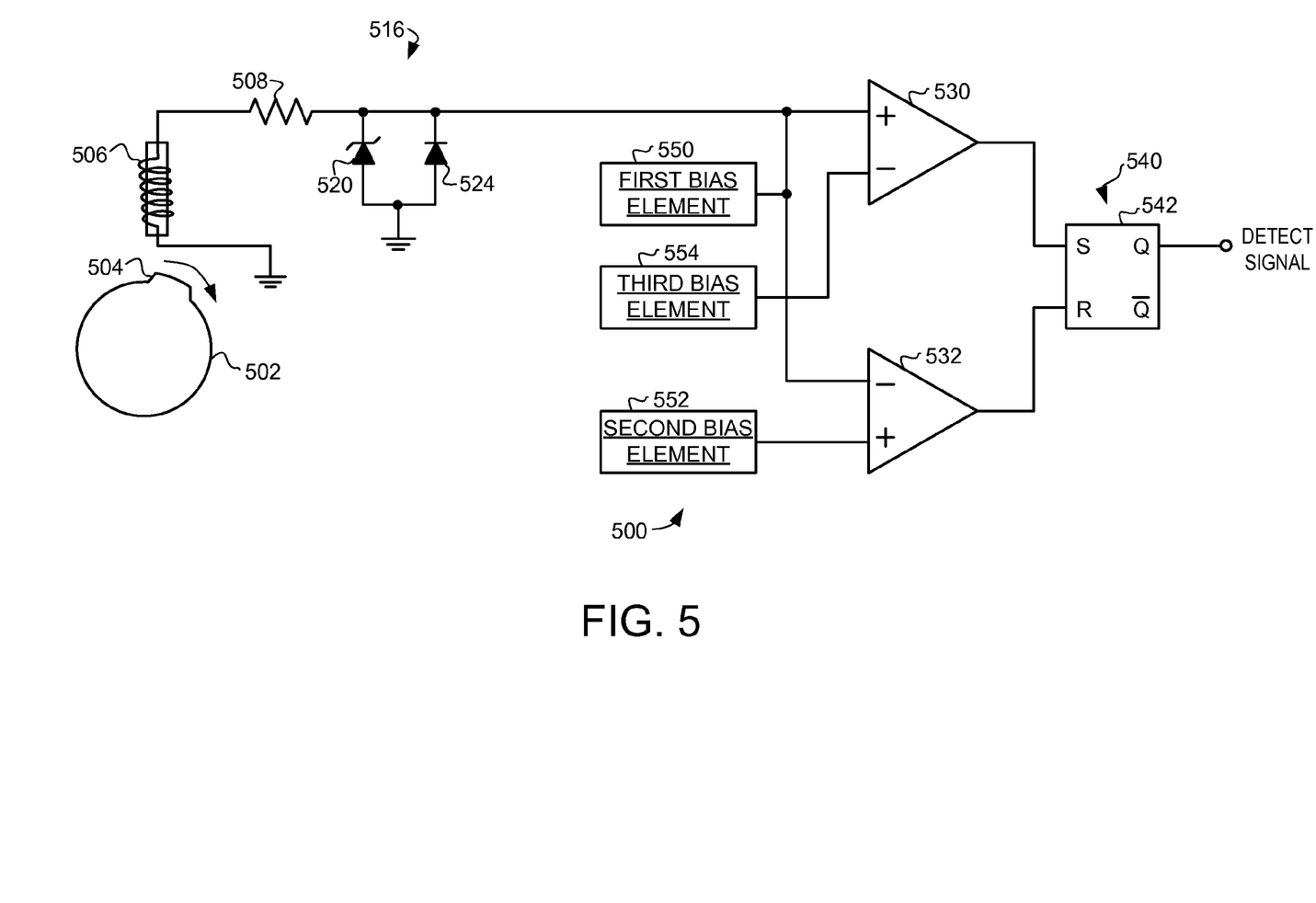
FIG. 5 is a schematic diagram of a variable reluctance sensor interface in accordance with another example embodiment.

Turning now to FIG. 5, a schematic diagram of another embodiment of a VRS interface 500 is illustrated. The VRS interface 500 includes a resistor 508, a clamping circuit 516, a leading edge comparator 530, a trailing edge comparator 532, and a post-processing circuit 540. Also included are a first bias element 550, a second bias element 552, and a third bias element 554. As will be described below, these bias elements 550, 552 and 554 are implemented to provide bias voltages for reducing erroneous transitions in the generated detect signal pulses.

In this illustrated example the VRS interface 500 is coupled to a VRS 506. The VRS 506 generates a VRS signal which is processed by VRS interface 500. Specifically, the VRS 506 is configured to sense the rotation of a tooth 504 on a trigger wheel 502. In the illustrated configuration, the VRS 506 includes a coil and biasing magnet which is orthogonally positioned relative to the trigger wheel 502. The trigger wheel 502 may be mounted to a crankshaft (not shown) or other rotating member. The trigger wheel 502 is configured as a toothed wheel, and the VRS 506 senses each passing of the tooth 504. Specifically, as the trigger wheel 502 rotates, each passing of the tooth 504 causes a change in the magnetic flux of the biasing magnet through the coil. The coil converts this changing magnetic flux to an electrical VRS signal. The VRS signal is applied to the VRS interface 500 at the input node of resistor 508. The actual form of the VRS signal generated by the VRS 506 depends on various system parameters, such as the shape and configuration of the teeth, the position and/or orientation of the VRS 506, etc.

The resistor 508 and the clamping circuit 516 again serve to limit the current and voltage swings in the interface 500 to acceptable levels. Specifically, clamping circuit 516 is implemented with the diodes 520 and 524. The diodes 520 and 524 serve to limit voltage swings in the VRS interface 200 to acceptable levels. Likewise, the resistor 508 serves to limit current through the VRS interface.

The VRS signal is provided to the non-inverting (+) input of the leading edge comparator 530 and to the inverting (−) input of the trailing edge comparator 532. The first bias element 550 is coupled to the non-inverting input of the leading edge comparator 530 and to the inverting input of the trailing edge comparator 532. The second bias element 552 is coupled to the non-inverting input of the trailing edge comparator 532. The third bias element 554 is coupled to the inverting input of the leading edge comparator 530. The first bias element 550 provides a DC common mode voltage to the VRS signal. The second bias element 552 provides a reference signal to the trailing edge comparator 532, and the third bias element 554 provides a reference signal to the leading edge comparator 530. In some embodiments the reference signals provided by the bias elements 552 and 554 can be the same or equivalent voltage. In other embodiments different reference signals are provided by the bias elements 552 and 554. For example, different voltage values can be provided to individually control the threshold values and thus the switching points of the comparators 530 and 532.

During operation the leading edge comparator 530 outputs a leading edge signal to one input of the post-processing circuit 540. This leading edge signal is asserted when a leading edge of a tooth 504 causes an increase in the VRS signal above a first threshold value determined by the third bias element 554. Likewise, the trailing edge comparator 532 outputs a trailing edge signal to the other input of the post-processing circuit 540. This trailing edge signal is asserted when a trailing edge of a tooth 504 causes a decrease in the VRS signal below the second threshold value determined by the second bias element 552. Both the leading edge signal and the trailing edge signal are provided to the post-processing circuit 540.

In this illustrated embodiment the post-processing circuit 540 is implemented with a set-reset (SR) latch 542. The leading edge signal is provided to the first input (i.e., the set input) of the latch 542, and the trailing edge signal is provided to the second input (i.e., the reset input) of the latch 542. The latch 542 output asserts in response to an asserted first input, and the latch 542 output resets in response to an asserted reset input. Thus, the latch 542 operates to generate detect signal pulses with the leading edge of the pulse determined by the timing of the assertion of the leading edge signal and the trailing edge of the pulse set by the timing of the assertion of the trailing edge signal. It should be noted that the SR latch 542 is just one example of the type of circuit that can be used for post-processing circuit 540. For example, other latches and other logic circuits can be used.

In accordance with the embodiments described herein the first bias element 550, the second bias element 552, and the third bias element 554 are configured to increase the probability of correctly detecting leading and trailing edges of the tooth and to reduce the probability of erroneous transitions in the detect signal pulse. These bias elements 550, 552 and 554 can be implemented with any suitable type of device for providing a bias voltage. For example, the bias elements can be implemented with a band gap voltage reference circuit, resistor divider circuit, or any other suitable mechanism for providing a reference voltage.

So implemented, the first bias element 550 effectively provides a DC common mode bias to the incoming AC VRS signal. The second bias element 552 provides a bias voltage used to determine this second threshold of the trailing edge comparator 532. The third bias element 554 provides a bias voltage used to determine the first threshold of the leading edge comparator 530. Taken together, this use of bias elements 550, 552, and 554 may reduce the probability of erroneous transitions by reducing the probability that the VRS signal will drop below the second threshold voltage in between the leading and trailing edges of the tooth 504. Furthermore, this may thus prevent a trailing edge signal from being erroneously asserted, and may likewise prevent erroneous transitions in the detect signal pulse.

It should be noted that the second bias element 552 and the third bias element 554 allow for individual adjustments of the threshold values for the leading edge comparator 530 and the trailing edge comparator 532. As one specific example, the second threshold value of the trailing edge comparator 532 can be less than the first threshold value of the leading edge comparator 530. And again, the bias elements 550, 552 and 542 reduce the probability of erroneous transitions that could otherwise occur in the detect signal pulse. Instead, only transitions corresponding to the passing of actual tooth edges by the VRS 506 are generated, resulting in a clean and accurate detect signal pulse that may be used to determine the position and/or speed of the rotating wheel 502.

Figure 6:
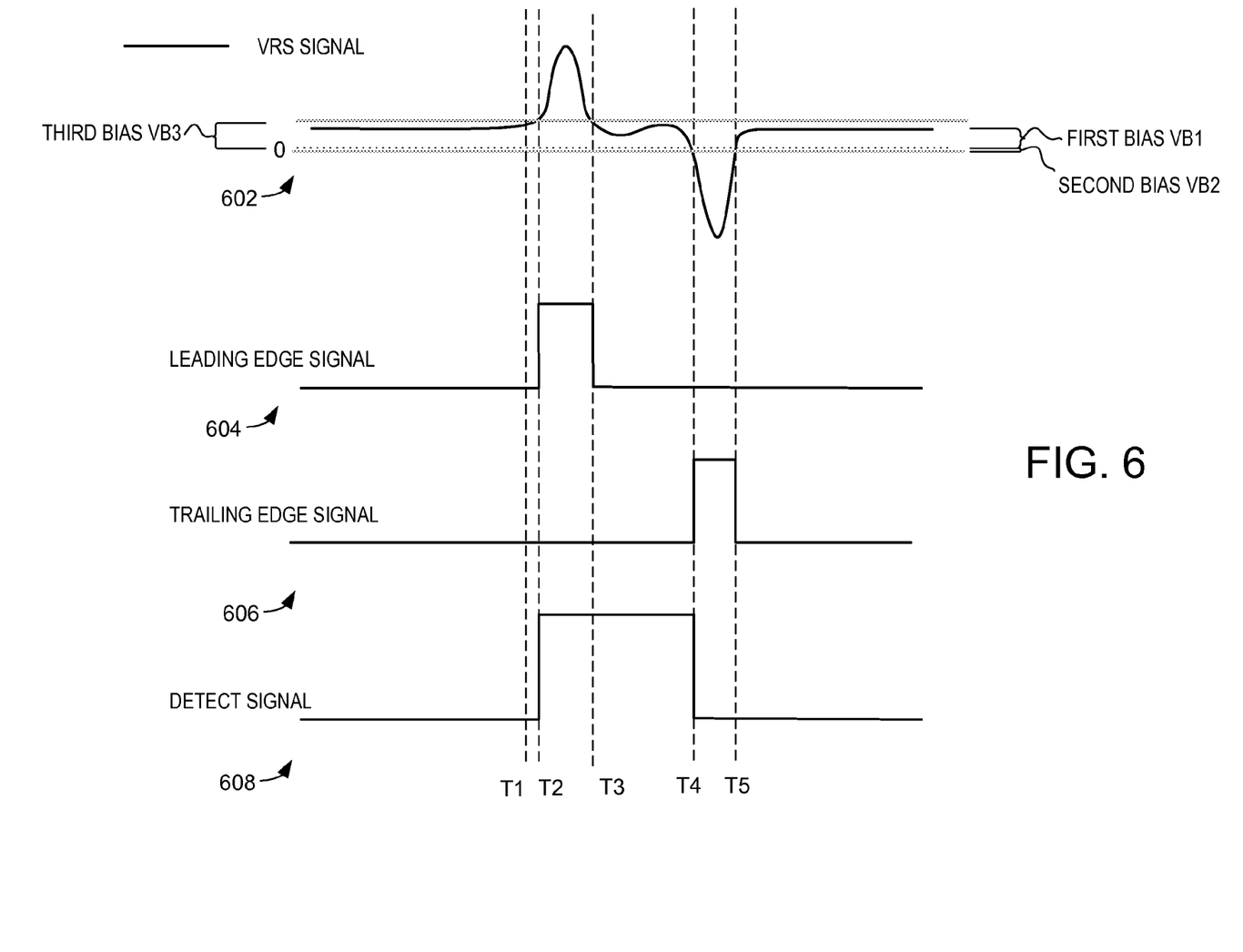
FIG. 6 is a graphical representation of a variable reluctance sensor signal, leading edge signal, trailing edge signal, and detect signal pulse in accordance with another example embodiment.

Turning now to FIG. 6, a graphical representation of an exemplary VRS signal 602, a leading edge signal 604, a trailing edge signal 606, and a resulting detect signal 608 generated by the VRS interface 500 are illustrated. In this example the VRS signal 602 does not drop below the second threshold value between leading and trailing edges of the tooth, and thus erroneous transitions in the detect signal 608 that do not correspond to actual tooth edges are not generated. In this embodiment the first bias element 550 provides a bias voltage VB1 of about 2.5 V, the second bias element provides a bias voltage VB2 of about −100 mV, and the third bias element provides a bias voltage VB3 of about 2.9 V. Stated another way the second bias voltage VB2=VB1−2.6 V, and the third bias voltage VB3=VB1+0.4V. Thus, the second bias voltage VB2 is less than the first bias voltage VB1, while the third bias voltage VB3 is greater than the first bias voltage VB1. Of course, these are just examples and other bias voltages can be used.

In general, during operation the VRS signal 602 increases in response to the leading tooth edge and decreases when the tooth 504 is aligned with the VRS 506, and then decreases further as the trailing tooth edge passes and the tooth 504 begins to retreat from the VRS 506 reaching a negative peak. The next passing of the tooth 504 generates similar positive and negative peaks in the VRS signal 602 after any dead-time period between passings of the tooth 504 or other such consecutive teeth.

Referring now to FIGS. 5 and 6 together, the VRS signal 602 is offset due to the effects of the bias voltage applied by the first bias element 550 to the non-inverting input of the leading edge comparator 530 and to the inverting input of the trailing edge comparator 532. In FIG. 6 this is shown by the positive shift upward of the VRS signal 602 relative to the ground (e.g., compared to the VRS signal 802 illustrated in FIG. 8). At time T1 the VRS signal 602 begins to increase in response to the leading edge of the tooth 504 rotating to the VRS 506 and the resulting change in magnetic flux. At time T2 the VRS signal 602 rises above the first threshold defined by the third bias element 554 and the leading edge comparator 530 asserts the leading edge signal 604. Note that the third bias element 554 has shifted the first threshold to be above the DC common mode biased VRS signal 602. Assertion of the leading edge signal 604 causes the post-processing circuit 542 to generate the leading edge of a detect signal 608 pulse. Then, in response to the leading edge of the tooth 504 passing the VRS 506, the VRS signal 602 drops as the change in flux ceases.

In this illustrated example however, the use of the first bias element 550 and the second bias element 552 reduces erroneous transitions because the VRS signal 602 does not drop below the second threshold value (defined by the second bias element 552) between times T2 and T4. However, when the trailing edge of the tooth 504 passes the VRS 506 the VRS signal 602 is driven low enough for the VRS signal 602 to drop below the second threshold value. This occurs at time T4, and causes trailing edge signal 606 to be asserted and the corresponding trailing edge of the detect signal 608 pulse to be correctly generated at time T4.

Thus generated, the generated detect signal 608 pulse has a width corresponding to the timing difference between the actual leading edge and trailing edge of the tooth 504 passing by the VRS. Both edges of this detect signal pulse can thus be used to accurately determine the angular position and/or rotational speed of the tooth 504 and the wheel 502. Stated another way, by providing the bias voltages to the trailing edge comparator 532 and the leading edge comparator 530 the VRS signal 602 is prevented from dropping below the second threshold value and false detections of the trailing tooth edge are reduced.

Next, the trailing edge of the tooth 504 passes the VRS 506 and in response the VRS signal 602 increases as the change in flux again ceases. At time T5 the VRS signal 602 reaches the second threshold value, causing the trailing edge comparator 532 to de-assert the trailing edge signal 606. This resets the trailing edge comparator 532 before the leading edge of the next tooth 504 is detected.

Figure 7:
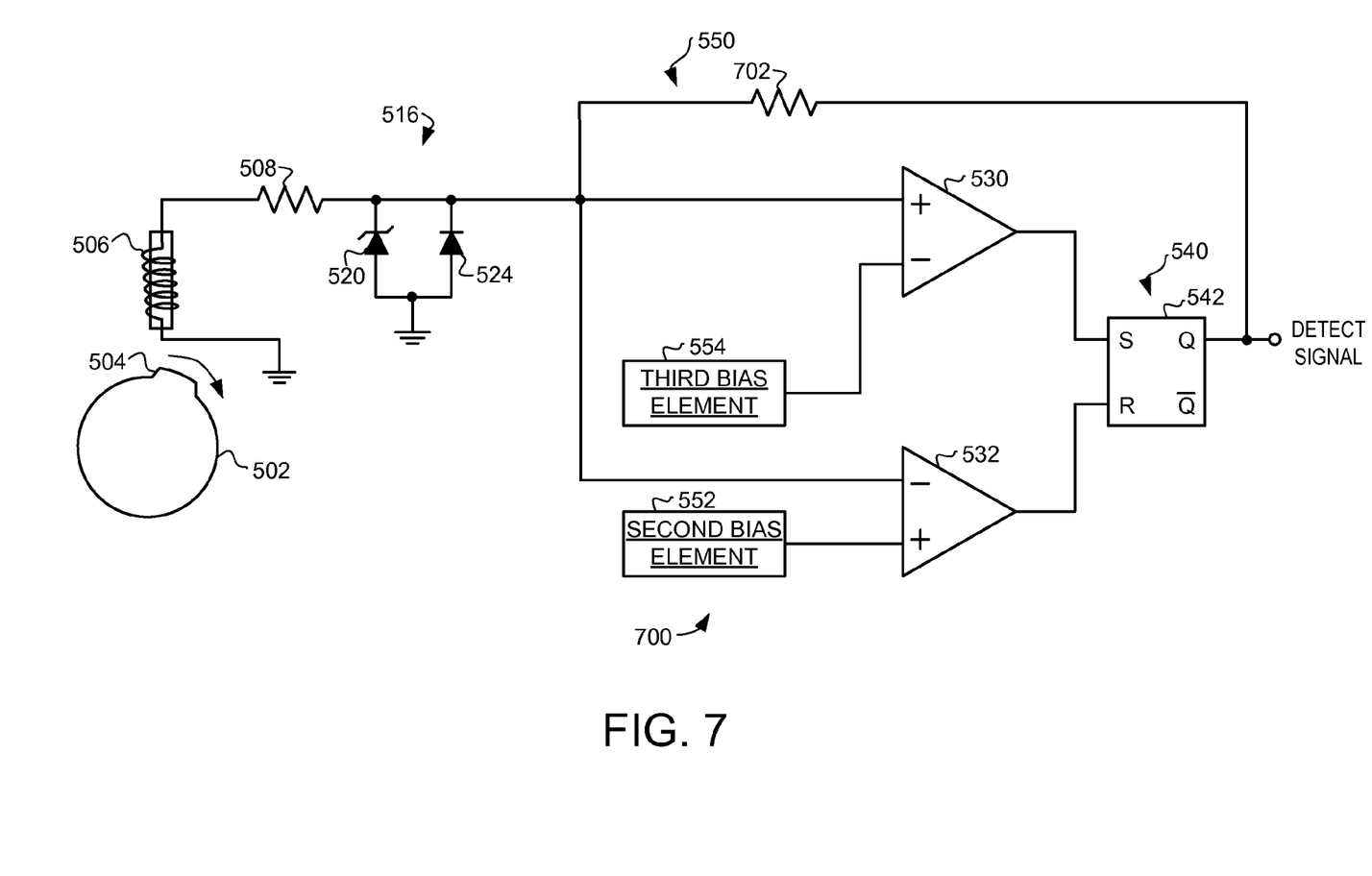
FIG. 7 is a schematic diagram of a variable reluctance sensor interface in accordance with another example embodiment.

It should be noted that the various bias elements 550, 552 and 554 can be implemented to provide constant DC biases, or can instead be implemented to provide variable biases—such as providing different DC bias levels at different times. For example, in one embodiment, one or more bias elements can be implemented to provide a state dependent bias, where the bias level is determined in part by the output of the VRS interface. Turning now to FIG. 7, a schematic diagram of another embodiment of a VRS interface 700 is illustrated. The VRS interface 700 is a variation on the VRS interface 500 illustrated in FIG. 5. However, in this variation, the first bias element 550 is implemented to provide a state dependent bias that varies with the output of the post-processing circuit 540. Thus, when the detect signal pulse is high the bias provided by the first bias element 550 is at one level, and when the detect signal pulse is low, the bias provided by the first bias element 550 is at a different level.

In the example of FIG. 7, the first bias element 550 comprises a resistor 702 coupled in a feedback path from the output of the post-processing circuit 540. This resistor 702 and feedback path provide a bias to the non-inverting input of the leading edge comparator 530 and to the inverting input of the trailing edge comparator 532. The level of bias provided is determined by the output voltage of the post-processing circuit 540 and the resistor divider formed by resistors 702 and 508. Thus, when the output of the post-processing circuit 540 is high, resistor divider provides a relatively high bias level determined by this high output and the resistor ratio of the resistor divider. When the output is low (e.g., zero) the bias level is corresponding low (e.g., zero).

Providing such a state dependent bias to the input of the leading edge comparator 530 and to the inverting input of the trailing edge comparator 532 may provide advantages compared to a constant bias. For example, the state dependent bias can improve the frequency response by allowing adjustment of the trailing edge comparator switching without changing the hysteresis or switching of leading edge signal.

Thus, the embodiments described herein provide a VRS interface that may reduce the probability of erroneous transitions in detect signals. As such, the VRS interface can improve the accuracy of position and/or motion determinations, and thus can improve the performance of a wide variety of devices that use variable reluctance sensors. In a first embodiment, a VRS interface is configured to include a trailing edge comparator with hysteresis. In a second embodiment, a VRS interface is configured to include a first biasing element and a second biasing element. In either case the VRS interface may reduce the probability of erroneous transitions by reducing the probability that the VRS signal will drop below the threshold voltage during the time period between the leading and trailing edges of a tooth passing the VRS. This may thus prevent a trailing edge signal from being erroneously asserted, and may likewise prevent erroneous transitions in the detect signal pulse.

In a first embodiment a system comprises a variable reluctance sensor interface for processing a variable reluctance sensor signal that reflects a magnetic flux variation that occurs when a tooth passes by a variable reluctance sensor, wherein the tooth has a leading tooth edge and a trailing tooth edge, and the variable reluctance sensor interface includes: a leading edge comparator including a first input configured to receive the variable reluctance sensor signal and including an output configured to assert a leading edge signal in response to the variable reluctance sensor signal reaching a first threshold value; a trailing edge comparator including a first input configured to receive the variable reluctance sensor signal and including an output, the trailing edge comparator implemented with hysteresis such that the output is configured to assert a trailing edge signal in response to the variable reluctance sensor signal decreasing to reach a second threshold value and continuing to assert the trailing edge signal until the variable reluctance sensor signal increases to reach a third threshold value different from the second threshold value; and a post-processing circuit configured to receive the leading edge signal and the trailing edge signal and generate a detect signal pulse having a width corresponding to a difference between assertion of the leading edge signal and assertion of the trailing edge signal.

In another embodiment a method comprises: processing a variable reluctance sensor signal that reflects a magnetic flux variation that occurs when a tooth passes by a variable reluctance sensor, wherein the tooth has a leading tooth edge and a trailing tooth edge, and wherein processing the variable reluctance sensor signal includes: asserting a leading edge signal responsive to the variable reluctance sensor signal reaching a first threshold value; asserting a trailing edge signal responsive to the variable reluctance sensor signal reaching a second threshold value; continuing to assert the trailing edge signal until the variable reluctance signal increases to reach a third threshold value different from the second threshold value; and generating a detect signal pulse having a width corresponding to a timing difference between assertion of the leading edge signal and assertion of the trailing edge signal.

In another embodiment s system comprises: a variable reluctance sensor interface for processing a variable reluctance sensor signal that reflects a magnetic flux variation that occurs when a tooth passes by a variable reluctance sensor, wherein the tooth has a leading tooth edge and a trailing tooth edge, and the variable reluctance sensor interface includes: a first biasing element configured to generate a first bias voltage, a second biasing element configured to generate a second bias voltage, a leading edge comparator including a first input, a second input, and an output, the first input configured to receive the variable reluctance sensor signal and further coupled to the first biasing element to receive the first bias voltage, and the output configured to assert a leading edge signal in response to a signal on the first input of the leading edge comparator reaching a first threshold value, and a trailing edge comparator including a first input, a second input and an output, the first input configured to receive the variable reluctance sensor signal and further coupled to the first biasing element to receive the first bias voltage, the second input coupled to the second biasing element to receive the second bias voltage, and the output configured to assert a trailing edge signal in response to a signal on the first input of the trailing edge comparator reaching a second threshold value, where the second threshold value is determined by the second bias voltage; and a post-processing circuit configured to receive the leading edge signal and the trailing edge signal and generate a detect signal pulse having a width corresponding to a timing difference between assertion of the leading edge signal and assertion of the trailing edge signal.

In another embodiment a method for processing a variable reluctance sensor signal that reflects a magnetic flux variation that occurs when a tooth passes by a variable reluctance sensor, wherein the tooth has a leading tooth edge and a trailing tooth edge, the method comprises: applying a first bias voltage to the variable reluctance sensor signal, resulting in a biased variable reluctance sensor signal; generating a second bias voltage; asserting a leading edge signal responsive to the biased variable reluctance sensor signal reaching a first threshold value; asserting a trailing edge signal responsive to the biased variable reluctance sensor signal reaching a second threshold value, the second threshold value determined by the second bias voltage; and generating a detect signal pulse having a width corresponding to a timing difference between assertion of the leading edge signal and assertion of the trailing edge signal.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematics shown in the figures depict several exemplary arrangements of elements, additional intervening elements, devices, features, or components may be present in other embodiments of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system comprising:
    a variable reluctance sensor interface for processing a variable reluctance sensor signal that reflects a magnetic flux variation that occurs when a tooth passes by a variable reluctance sensor, wherein the tooth has a leading tooth edge and a trailing tooth edge, and the variable reluctance sensor interface includes:
        a leading edge comparator including a first input configured to receive the variable reluctance sensor signal and including an output configured to assert a leading edge signal in response to the variable reluctance sensor signal reaching a first threshold value;
        a trailing edge comparator including a first input configured to receive the variable reluctance sensor signal and including an output, the trailing edge comparator implemented with hysteresis such that the output is configured to assert a trailing edge signal in response to the variable reluctance sensor signal decreasing to reach a second threshold value and continuing to assert the trailing edge signal until the variable reluctance sensor signal increases to reach a third threshold value different from the second threshold value; and
        a post-processing circuit configured to receive the leading edge signal and the trailing edge signal and generate a detect signal pulse having a width corresponding to a difference between assertion of the leading edge signal and assertion of the trailing edge signal.

2. The system of claim 1 wherein the variable reluctance sensor signal has a substantially constant voltage value when the leading tooth edge and trailing tooth edge are not proximate the variable reluctance sensor, and wherein the second threshold value is different than the substantially constant voltage value.

3. The system of claim 1 wherein the variable reluctance sensor signal increasing to the first threshold value corresponds to the leading tooth edge passing the variable reluctance sensor and wherein the variable reluctance sensor signal decreasing to reach a second threshold value corresponds to the trailing tooth edge passing the variable reluctance sensor.

4. The system of claim 1 wherein the tooth is on a trigger wheel coupled to a rotating shaft and wherein the detect signal pulse is used to determine an angular position of the rotating shaft.

5. The system of claim 1 wherein the trailing edge comparator is implemented with hysteresis internally.

6. The system of claim 1 wherein the trailing edge comparator is implemented with hysteresis externally using feedback from the output of the trailing edge comparator.

7. The system of claim 1, wherein the system is a capacitive discharge ignition system, and the system further comprises:
    the variable reluctance sensor configured to sense the tooth and to generate the variable reluctance sensor signal; and
    an ignition control unit configured to control ignition timing based at least in part on the detect signal pulse.

8. The system of claim 7 wherein the tooth is on a wheel that is coupled to a crankshaft of an internal combustion engine and wherein the detect signal pulse is used to determine an angular position of the crankshaft.

9. A system comprising:
    a variable reluctance sensor interface for processing a variable reluctance sensor signal that reflects a magnetic flux variation that occurs when a tooth passes by a variable reluctance sensor, wherein the tooth has a leading tooth edge and a trailing tooth edge, and the variable reluctance sensor interface includes:
        a first biasing element configured to generate a first bias voltage;
        a second biasing element configured to generate a second bias voltage;
        a leading edge comparator including a first input, a second input, and an output, the first input configured to receive the variable reluctance sensor signal and further coupled to the first biasing element to receive the first bias voltage, and the output configured to assert a leading edge signal in response to a signal on the first input of the leading edge comparator reaching a first threshold value,
        a trailing edge comparator including a first input, a second input and an output, the first input configured to receive the variable reluctance sensor signal and further coupled to the first biasing element to receive the first bias voltage, the second input coupled to the second biasing element to receive the second bias voltage, and the output configured to assert a trailing edge signal in response to a signal on the first input of the trailing edge comparator reaching a second threshold value, where the second threshold value is determined by the second bias voltage; and a post-processing circuit configured to receive the leading edge signal and the trailing edge signal and generate a detect signal pulse having a width corresponding to a timing difference between assertion of the leading edge signal and assertion of the trailing edge signal.

10. The system of claim 9 wherein the variable reluctance sensor interface further comprises a third biasing element configured to apply a third bias voltage to the second input of the leading edge comparator and thereby determine the first threshold value.

11. The system of claim 9 wherein the variable reluctance sensor signal increasing to the first threshold value corresponds to the leading tooth edge passing the variable reluctance sensor and wherein the variable reluctance sensor signal decreasing to reach the second threshold value corresponds to the trailing tooth edge passing the variable reluctance sensor.

12. The system of claim 9 wherein the tooth is on a trigger wheel coupled to a rotating shaft and wherein the detect signal pulse is used to determine an angular position of a rotating shaft.

13. The system of claim 9 wherein the first bias element is configured to provide a DC common mode voltage.

14. The system of claim 9 wherein the first bias element is configured to provide a state dependent bias that varies with the detect signal pulse.

15. The system of claim 9, wherein the system is a capacitive discharge ignition system, and the system further comprises:
 a variable reluctance sensor configured to sense the tooth and to generate the variable reluctance sensor signal; and
 an ignition control unit configured to control ignition timing based at least in part on the detect signal pulse.

16. The system of claim 15, wherein the tooth is on a wheel that is coupled to a crankshaft of an internal combustion engine and wherein the detect signal pulse is used to determine an angular position of the crankshaft.

\* \* \* \* \*